United States Patent

[11] 3,582,804

[72] Inventor Alfred B. Beck
Torrance, Calif.
[21] Appl. No. 811,299
[22] Filed Mar. 28, 1969
[45] Patented June 1, 1971
[73] Assignee T.R.W. Inc.
Redondo Beach, Calif.

[54] DISTRIBUTED AMPLIFIER DAMPING CIRCUITS
13 Claims, 1 Drawing Fig.

[52] U.S. Cl. .......... 330/54, 328/56
[51] Int. Cl. .......... H03f 3/60
[50] Field of Search .......... 330/54; 328/56

[56] References Cited
UNITED STATES PATENTS
2,978,579 4/1961 Sosin .......... 330/54X
3,210,682 10/1965 Sosin .......... 330/54
3,495,183 2/1970 Doundoulakis et al. .......... 330/54

*Primary Examiner*—Nathan Kaufman
*Attorneys*—Daniel T. Anderson, Alfons Valukonis and Frank E. Wattles

ABSTRACT: In a distributed amplifier adapted to amplify a bandwidth of signals having lower and upper band edge frequencies a parallel R-L-C circuit adapted for antiresonance at the upper band edge frequency is provided in series with at least one of the inductors in the series branches of the grid and plate transmission lines of the amplifier to provide stability to the amplifier. Additionally, another parallel R-L-C circuit adapted for antiresonance at the lower band edge frequency is provided in series with at least one of the inductors in the shunt branches of the amplifier grid and plate transmission lines to also provide increased stability to the amplifier.

PATENTED JUN 1 1971
3,582,804
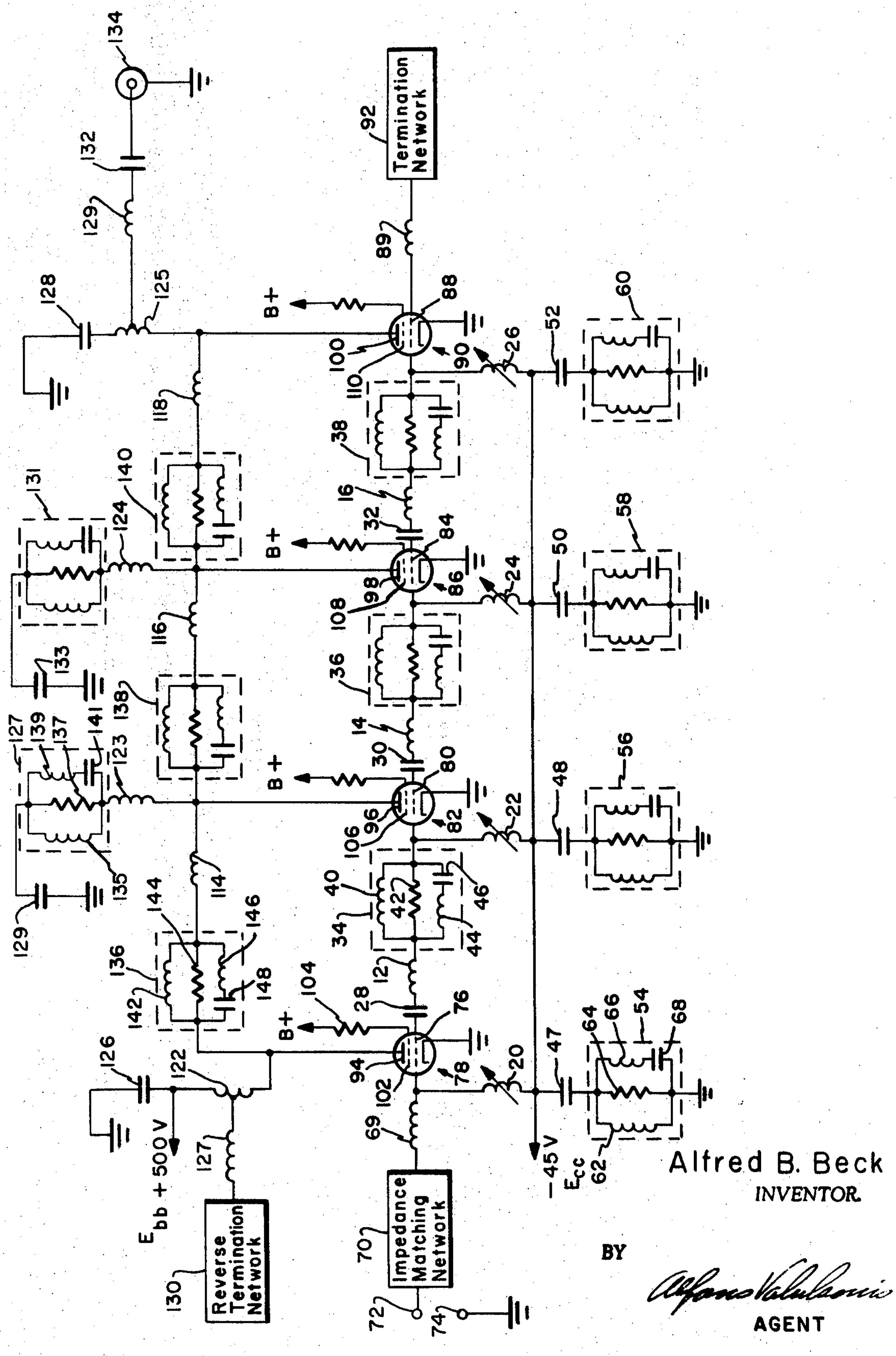
Alfred B. Beck
*INVENTOR.*
BY [signature]
AGENT

DISTRIBUTED AMPLIFIER DAMPING CIRCUITS

BACKGROUND OF THE INVENTION

1. Field of the Invention

This invention relates generally to distributed amplifiers and more particularly to damping circuits for increasing the stability of distributed amplifiers.

2. Description of the Prior Art

Conventional band-pass distributed amplifiers are intrinsically unstable at their cutoff frequencies because of internal feedback that causes band edge oscillation. As a consequence band edge gain peaks are pronounced with attendant detrimental effect on the amplifier ability to handle multiple tone signals with acceptable distortion. Sophisticated network alignment techniques may be used to realize conditional stability in prior art distributed amplifiers, however, it is extremely difficult to avoid oscillation when the amplifiers are operated with severely mismatched loads. U.S. Pat. No. 3,218,569 reveals and describes such a prior art distributed amplifier. Another prior art amplifying system of interest is revealed in U.S. Pat. No. 1,524,581.

SUMMARY OF THE INVENTION

In a distributed amplifier adapted to amplify a signal bandwidth with lower and upper band edge frequencies and having grid and plate transmission lines there is provided amplifier stabilizer apparatus with means in at least one of the grid and plate transmission lines for damping oscillation of lower band edge frequency signals, and means in at least one of the grid and the plate transmission lines for damping oscillation of upper band edge frequency signals.

BRIEF DESCRIPTION OF THE DRAWING

The sole FIGURE in the drawing is a schematic showing of a distributed amplifier incorporating the invention.

DESCRIPTION OF THE PREFERRED EMBODIMENTS

In the sole FIGURE of the drawings there is shown a band-pass distributed amplifier circuit incorporating the present invention, and which is capable of amplifying a bandwidth of frequencies having lower and upper frequency limits $F_1$ and $F_2$, respectively. The particular embodiment of the invention illustrated includes a first or input grid transmission line having series inductors 12, 14, and 16 in the series branches of the line and variable shunt inductors 20, 22, 24, and 26 in the shunt branches. Provided in series connection with the inductors 12, 14, and 16 are capacitors 28, 30, and 32, and antiresonant damping circuits 34, 36, and 38.

The damping circuit 34 consists of an inductor 40 connected in parallel with a resistor 42 and a series arrangement of an inductor 44 and capacitor 46 to provide antiresonance at the upper band edge frequency $F_2$ of the amplified passband. The circuits 36 and 38 can additionally be provided which are structurally and functionally similar to the circuit 34 and each includes like components similarly arranged to also provide antiresonance at the upper band edge frequency $F_2$ of the amplifier passband with increased amplifier stability.

In series with the inductors 20, 22, 24, and 26 there is provided capacitors 47, 48, 50 and 52 and antiresonant damping circuits 54, 56, 58, and 60. Circuit 54 consists of an inductor 62 connected in parallel with a resistor 64 and a series arrangement of an inductor 66 and capacitor 68. Antiresonant circuits 56, 58, and 60 are similar to the circuit 54 and each includes like components similarly arranged. The circuits 54, 56, 58, and 60 are adapted to provide parallel antiresonance at the lower band edge frequency $F_1$.

The input end of the grid transmission line is connected through an inductor 69 and an impedance matching network 70 to a pair of input terminals 72 and 74 which are adapted to be connected to a source of input signal (not shown). The impedance matching network 70 can be of the type described in U.S. Pat. No. 3,218,569 and need not be described in greater detail here, it being sufficient that it has suitable electrical characteristics to match the input grid transmission line to the selected source of input signal, as is well known in the art. The junction of the inductors 20 and 69 is connected to the grid 76 of a first vacuum tube 78. The junction of the damping circuit 34 and the inductor 22 is connected to the grid 80 of a second vacuum tube 82. Similarly the junction of circuit 36 and the inductor 24 is connected to the grid 84 of a third tube 86, and the junction of the circuit 38 and inductor 26 is connected to the grid 88 of a fourth vacuum tube 90. The capacitors 28, 30, and 32 are connected to the grids 76, 80, and 84, respectively. An inductor 89 is connected at one end to the grid 88 of vacuum tube 90 and at the other end to a termination network 92, of the type disclosed and described in greater detail in the above referred to U.S. Pat. No. 3,218,569.

The vacuum tubes 78, 82, 86, and 90 are high power amplifier devices of the tetrode type having fluid cooled anodes 94, 96, 98, and 100, respectively. The screen grid 102 of the tube 78 is connected through a series current limiting resistor 104 to a positive potential source $B^+$. The screen grids 106, 108, and 110 of the tubes 82, 86, and 90, respectively, are similarly connected to the positive potential source $B^+$.

The anodes 94, 96, 98, and 100 are connected to spaced points, respectively, along a second or output plate transmission line having series inductors 114, 116, and 118 in the series branches of the line and shunt inductors 122, 123, 124, and 125 in the shunt branches of the line. The shunt inductor 122 is connected at one end through capacitor 126 to ground and at the other end to the plate 94 of tube 78. The junction point between the inductor 122 and capacitor 126 is connected to a source of plate potential $E_{bb}$. The other inductor 125 is similarly connected at one end to anode 100 of tube 90 and to ground through a capacitor 128 at the other end.

Shunt inductor 122 has a midtap connected through an inductor 127 to a reverse termination network 130 which is a fluid cooled structure capable of dissipating reverse power on the order of several hundred watts and of the type revealed in the above U.S. Pat. No. 3,218,569. The shunt inductor 125 has a midtap connected through an inductor 129 and a capacitor 132 to the center terminal of a coaxial output connector 134. The negative or outside terminal of the connector 134 is connected to ground.

Shunt inductor 123 is connected at one end through an antiresonant circuit 127 and a capacitor 129 to ground. The other end of the inductor 123 is connected to the anode 96. Similarly, inductor 124 is connected at one end to the anode 98 of tube 86 and to ground at the other end through antiresonant circuit 131 and capacitor 133. The circuit 127 consists of an inductor 135 connected in parallel with a resistor 137 and a series arrangement of an inductor 139 and a capacitor 141, the arrangement being antiresonant at the lower band edge frequency $F_1$. The circuit 131 is similarly antiresonant at the frequency $F_1$ and includes like components as the circuit 127.

As shown in the FIGURE antiresonant damping circuits 136, 138, and 140 are also provided in series arrangement with the inductors 114, 116, and 118 in the series branches of the plate line, respectively. Circuit 136 consists of an inductor 142 connected in parallel with a resistor 144 and a series arrangement of an inductor 146 and a capacitor 148. The circuits 138 and 140 are similar and include like components and are antiresonant at the upper band edge frequency $F_2$.

Operation of the amplifier illustrated in the FIGURE is as follows: An alternating voltage wave applied to terminals 72 and 74 propagates along the input grid line. As the voltage wave arrives at the grid of a tube, an amplified alternating current is injected into the output plate line. One-half of the current propagates toward the output terminal 134 and the other half flows toward the reverse termination network 130. The complex propagation constants of the grid and plate lines are matched within the frequency passband $F_1F_2$, as is well known in the art, so that the individual tube plate current components flowing toward coaxial output 134 are in phase and produce maximum useful output power. Conversely, the plate current components that flow into the reverse termination network 130 are scattered in relative phase so as to cancel one another. As previously described in detail in U.S. Pat. No. 3,218,569, and herein briefly stated, the gain of a distributed amplifier is proportional to the product of the midshunt image impedances of the grid and plate transmission lines. These impedances are frequency dependent and exhibit poles at the edge of frequencies $F_1$ and $F_2$ of the amplifier passband. Accordingly, the latent amplifier gain can approach infinity at these critical passband edge frequencies $F_1$ and $F_2$ unless corrected. Further aggravation of the condition takes place because of interelectrode capacitance between the plate and grid of each tube constitutes an undesirable feedback path that causes band edge oscillation in the amplifier.

The damping circuit approach of the present invention provides a solution to the distributed amplifier stability problem. The parallel antiresonant R-L-C arrangement 34, which is inserted in series connection with the inductor 12 in a series branch of the grid transmission line behaves as a frequency sensitive circuit to spoil the quality factor Q of the series branch impedance at the frequency $F_2$. The resultant degradation of the quality factor Q at the frequency $F_2$ stabilizes the amplifier by limiting the magnitude of the band edge peak in the grid transmission line midshunt impedance and consequently the gain of the amplifier. Similarly, the other R-L-C damping circuits 36 and 38 degrade the quality factor Q of the series branches in which they are connected at the band edge frequency $F_2$ to further improve amplifier stability. The damping circuits 136, 138, and 140 in the series branches of the plate transmission line in series with the inductors 114, 116, and 118, respectively, also contribute increased stability to the amplifier. In this instance the damping circuits degrade the quality factor Q of the respective series branches at the frequency $F_2$ to limit the magnitude of the band edge peak in the midshunt impedance of the plate transmission line and gain of the amplifier.

Still further arrangement in the amplifier stability at the lower band edge frequency $F_1$ is achieved by the provision of damping circuits 54, 56, 58, and 60 which are provided in series connection with the inductors 20, 22, 24, and 26 in the shunt branches of the grid transmission line, respectively. These damping circuits change the quality factor Q of the shunt branches in a like manner to stabilize the amplifier at the frequency $F_1$.

Similarly, the circuits 127 and 131 which are adapted for antiresonance at the frequency $F_1$ change the quality factor Q of the plate transmission line shunt branches to further add to the stabilizing of the amplifier at this frequency $F_1$.

Obviously many modifications and variations of this invention are possible in view of the above teachings. It is therefore to be understood that within the scope of the appended claims the invention may be practiced otherwise than as specifically described.

I claim:

1. Stabilizing apparatus for tube-type distributed amplifiers capable of amplifying a signal bandwidth with lower and upper band edge signal frequencies and having grid and plate transmission lines, the grid lines each having series branches connecting the grids of the tubes and shunt branches connecting the grids of the tubes to ground, and the plate lines each having series branches connecting the plates of the tubes and shunt branches connecting the plates of the tubes to ground, said stabilizing apparatus comprising:

means connected in a series branch of the grid and plate transmission lines for damping oscillation of the upper band edge signal frequency; and means connected in a shunt branch of the grid and plate transmission lines for damping oscillation of the lower band edge signal frequency.

2. The stabilizing apparatus of claim 1 wherein said means for damping oscillation of the upper band edge signal frequency comprises:

circuit means providing antiresonance at the upper band edge frequency.

3. The stabilizing apparatus of claim 2 wherein said circuit means comprises:

a parallel arrangement of inductance, capacitance, and resistance means.

4. The stabilizing apparatus of claim 3 wherein said means for damping oscillation of the lower band edge signal frequency comprises:

circuit means providing antiresonance at the lower band edge frequency.

5. The stabilizing apparatus of claim 4 wherein said circuit means comprises:

a parallel arrangement of inductance, capacitor, and resistance means.

6. Stabilizing apparatus for tube-type distributed amplifiers capable of amplifying a signal bandwidth with lower and upper band edge signal frequencies and having grid and plate transmission lines, the grid lines each having series branches connecting grids of the tubes and shunt branches connecting the grids of the tubes to ground, and the plate lines each having series branches connecting the plates of the tubes and shunt branches connecting the plates of the tubes to ground, said stabilizing apparatus comprising:

a parallel arrangement of an inductor, a capacitor, and a resistor providing antiresonance at the upper band edge frequency in each of the series branches of the grid and plate transmission lines; and a parallel arrangement of an inductor, a capacitor, and a resistor providing antiresonance at the lower band edge frequency in each of the shunt branches of the grid and plate transmission lines.

7. A distributed amplifier comprising:

a plurality of tubes having grids and plates for amplifying a signal bandwidth having lower and upper band edge signal frequencies;

an input grid transmission line having series branches connecting said grids to each other, and shunt branches connecting said grids to ground;

an output plate transmission line having series branches connecting said plates to each other, and shunt branches connecting said plates to ground; and means connected in a series branch of said grid and plate transmission lines for damping oscillation of said upper band edge signal frequency.

8. A distributed amplifier as set forth in claim 7 wherein said damping means comprises:

an antiresonant circuit.

9. A distributed amplifier as set forth in claim 8 wherein said antiresonant circuit comprises:

a parallel resonant circuit having an inductor, a resistor, and a series arrangement of an inductor and a capacitor.

10. A distributed amplifier as set forth in claim 7 further comprising:

means connected in a shunt branch of said grid and plate transmission lines for damping oscillation of said lower band edge signal frequency.

11. A distributed amplifier as set forth in claim 10 wherein said last-mentioned means comprises:

an antiresonant circuit.

12. A distributed amplifier as set forth in claim 11 wherein said antiresonant circuit comprises:

a parallel resonant circuit having an inductor, a resistor, and a series arrangement of an inductor and a capacitor.

13. A distributed amplifier comprising:

a plurality of tubes having grids and plates for amplifying a signal bandwidth having lower and upper band edge signal frequencies;

an input grid transmission line having series branches connecting said grids to each other, and shunt branches connecting said grids to ground;

an output plate transmission line having series branches connecting said plates to each other, and shunt branches connecting said plates to ground;

a parallel circuit connected in each of said series branches of said grid and plate transmission lines and having an inductor, a resistor, and a series arrangement of an inductor and a capacitor, said parallel circuit being resonant at said upper band edge signal frequency; and a parallel circuit connected in each of said shunt branches of said grid and transmission lines and having an inductor, a resistor, and a series arrangement of an inductor and a capacitor, said parallel circuit being resonant at said lower band edge signal frequency.